United States Patent

Haik et al.

(10) Patent No.: US 9,092,854 B2
(45) Date of Patent: Jul. 28, 2015

(54) METRICS TO IDENTIFY IMAGE SMOOTHNESS

(71) Applicant: HEWLETT-PACKARD INDIGO B.V., Amstelveen (NL)

(72) Inventors: Oren Haik, Nes Ziona (IL); Tal Frank, Nes Ziona (IL); Tamar Kashti, Nes Ziona (IL)

(73) Assignee: Hewlett-Packard Indigo B.V., Maastricht (NL)

(*) Notice: Subject to any disclaimer, the term of this patent is extended or adjusted under 35 U.S.C. 154(b) by 64 days.

(21) Appl. No.: 13/954,143

(22) Filed: Jul. 30, 2013

(65) Prior Publication Data

US 2015/0036946 A1 Feb. 5, 2015

(51) Int. Cl.
G06K 9/40 (2006.01)
G06T 5/00 (2006.01)

(52) U.S. Cl.
CPC ....... G06T 5/002 (2013.01); G06T 2207/20182 (2013.01)

(58) Field of Classification Search
None
See application file for complete search history.

(56) References Cited

U.S. PATENT DOCUMENTS

| | | | | |
|---|---|---|---|---|
| 6,133,927 | A * | 10/2000 | Arai et al. | 347/131 |
| 6,571,000 | B1 | 5/2003 | Rasmussen et al. | |
| 6,584,233 | B1 * | 6/2003 | Kane et al. | 382/254 |
| 8,441,685 | B2 * | 5/2013 | Wu et al. | 358/2.1 |
| 8,477,372 | B2 * | 7/2013 | Wu et al. | 358/1.9 |
| 2010/0021189 | A1 * | 1/2010 | Sheflin et al. | 399/49 |
| 2012/0086959 | A1 | 4/2012 | Wu et al. | |
| 2012/0133764 | A1 | 5/2012 | Hurlbut | |
| 2012/0154831 | A1 | 6/2012 | Wu et al. | |
| 2012/0257256 | A1 * | 10/2012 | Wakui | 358/3.06 |

OTHER PUBLICATIONS

Ahmed H. Eid et al., "Characterization of Mottle and Low Frequency Print Defects," Proc. of SPIE-IS&T Electronic Imaging, SPIE vol. 6808, 680809, 2008, pp. 1-12, Available at: <www2.Iirmm.fr/Iirmm/interne/BIBLI/CDROM/ROB/2008/Electronic%20Imaging_2008/DATA/6808_9.PDF>.
Carl-Magnus Fahlcrantz and Kristoffer Sokolowski, "Evaluating Colour Print Mottle," 3rd IARIGAI Research Conference, 2006, pp. 1-15.
John C. Briggs et al., "Applications of ISO-13660, A New International Standard for Objective Print Quality Evaluation," Japan Hardcopy '99, Imaging Society of Japan, Jul. 21-23, 1999, Tokyo, Japan, pp. 1-6.
Ki-Youn Lee et al., "Characterization of '2D noise' Print Defect," SPIE-IS&T/ vol. 7242, 2009, pp. 1-7.
L. Shapira and B. Oicherman, "Black is Green: Adaptive Color Transformation for Reduced Ink Usage," Eurographics 2012, pp. 365-372, vol. 31 (2012), No. 2, 2011, Computer Graphics Forum.
Yung-Yao Chen et al., "The Lattice-Based Screen Set: A Square N-Color All-Orders Moire-Free Screen Set," SPIE-IS&T/ vol. 8292, 2012, pp. 1-13.

* cited by examiner

Primary Examiner — Wenpeng Chen
Assistant Examiner — Feng Niu

(57) ABSTRACT

A system includes a structure module, graininess module, mottle module, and standard deviation (STD) module. The structure module is to identify a structure metric based on an input digital image, and remove a structured nonuniformity from the input digital image to produce a second input digital image. The graininess module is to identify a graininess metric based on the second input digital image. The mottle module is to identify a mottle metric based on the second input digital image. The STD module is to identify a STD metric that is to correspond to overall smoothness of the input digital image.

18 Claims, 6 Drawing Sheets

2D Fourier Transform of Substantially Uniform Gray Level Image

Dust region 303B       Image with dust 302B       Non-dust region 304B

Fourier:
STD = 5.1484
graininess = 3.60
mottle = 3.67
structure = 0.003

Wavelet:
STD = 1.3
graininess = 1.13
mottle = 0.7
structure = 0.004

Fourier:
STD = 1.15
graininess = 0.8
mottle = 0.7
structure = 0.01

Wavelet:
STD = 1.1
graininess = 0.9
mottle = 0.6
structure = 0.01

METRICS TO IDENTIFY IMAGE SMOOTHNESS

BACKGROUND

Image smoothness may be subjectively perceived by an observer. The International Organization for Standardization (ISO) 13660 standards provide a technique to measure graininess and mottle of gray patches. Such technique is based on calculating a standard deviation of small tiles within a sufficiently large area. However, standard deviation may be unable to fully account for the subjective effects of the perception of image smoothness by an observer.

BRIEF DESCRIPTION OF THE DRAWINGS/FIGURES

DETAILED DESCRIPTION

An objective metric to measure the smoothness of an image or print may be helpful to improve image and print quality. Images may contain periodic/quasi-periodic (structured) patterns that can affect attempts to evaluate smoothness metrics, such as graininess and mottle. Examples provided herein may separate periodic/quasi-periodic (structured) patterns from non-structured features of the image, enabling specifically targeted evaluation of individual components that may affect image smoothness. The separation of structured and non-structured components may be based on setting a threshold for each pixel based on local image properties, in contrast to using a single global threshold. Thus, examples may detect structured quasi-periodic noise, even noise that is characterized by small, low-contrast peaks in Fourier domain. Example systems may separate an input image into its structured and non-structured components as a pre-processing stage for removing periodic/quasi-periodic (structured) patterns from the input image before measuring graininess or mottle according to various techniques (including ISO 13660).

Smoothness metrics may be used, e.g., to aid in the design of smoother halftone masks that are used for printing. The smoothness metrics may be used to predict characteristics of the prints a-priori (meaning, before being printed) and identify sources of non-uniformities (e.g., graininess, mottle, and/or structure). Thus, example metrics may be used in a printing system or other image rendering system to estimate and eliminate graininess before a print run, thereby shortening a development cycle. Example digital estimator systems may be tuned to agree with a human observer, may be used to separate individual noise types, and may be used to determine root cause of image issues/noise. For example, noise may be separated into non-periodic high frequency noise, non-periodic low frequency noise, and periodic/quasi periodic (structured) noise. Thus, an input image may be processed by example systems to determine a separate smoothness level for graininess, mottle, and structure characteristics of the input image. Image processing may be performed on the input image to modify the image (and/or procedures relating to the image such as a print run, a print screen, etc.) in view of the separate characteristics, to reduce at least one of the determined noise characteristics.

Figure 1:
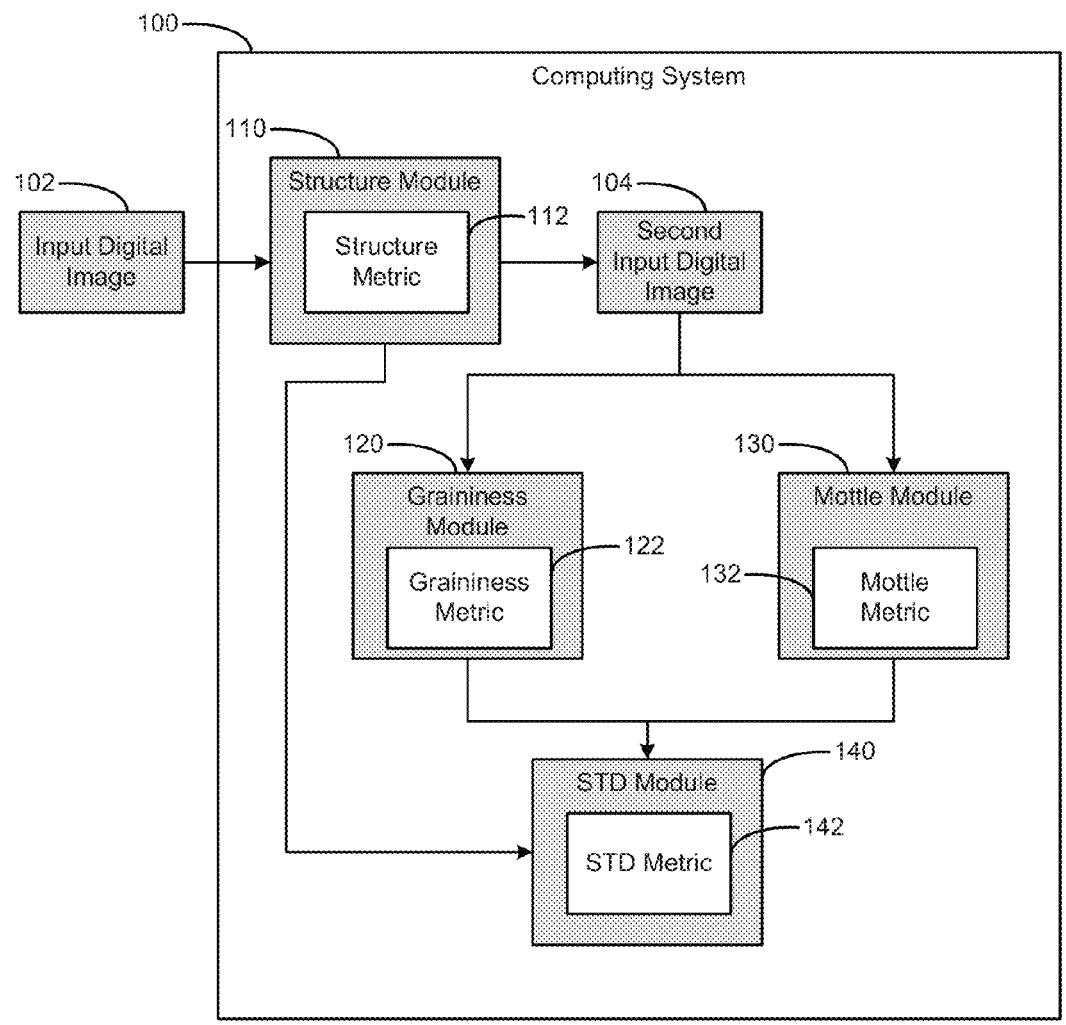
FIG. 1 is a block diagram of a computing system including a structure module, a graininess module, a mottle module, and a standard deviation (STD) module according to an example.

FIG. 1 is a block diagram of a computing system 100 including a structure module 110, a graininess module 120, a mottle module 130, and a standard deviation (STD) module 140 according to an example. The structure module 110 is to receive input digital image 102, and provide second input digital image 104 and a structure metric 112. The graininess module 120 is to receive the second input digital image 104 and provide graininess metric 122. The mottle module 130 is to receive the second input digital image 104 and provide the mottle metric 132. The standard deviation (STD) module 140 is to receive the structure metric 112, the graininess metric 122, and the mottle metric 132, and provide the STD metric 142.

The system 100 may measure smoothness, including its different components, to produce smoother prints and better printing halftone masks (screens). A measure of total smoothness according to the various examples provided herein may include three components/elements: graininess, mottle, and structure. Generally, graininess may refer to small-scale random non-uniformities, and mottle may refer to large-scale random non-uniformities. Structure may refer to periodic/quasi-periodic patterns/noise. Structured noise can result from, e.g., a halftone's moiré effects or a press's mechanical bands, whereas mottle and graininess may be caused by dot configuration (halftone) and dot gain (press). In an example, graininess may represent period-fluctuations (noise) of image density at a spatial frequency higher than, e.g., 0.4 cycles per millimeter (mm) in any direction. Mottle may represent aperiodic fluctuations of image density at a spatial frequency of less than, e.g., 1.0 cycles per mm in any direction. Other values of cycles per mm to represent graininess and mottle are possible (e.g., greater than or less than 1.0 cycle per mm).

To achieve smoother images and/or prints, system 100 may measure the total smoothness (e.g., STD metric 142), as well as the individual separate components of the smoothness including the structure metric 112, the graininess metric 122, and the mottle metric 132. System 100 and the various modules enable prediction of the smoothness of digital images (e.g., screens) before printing. System 100 may measure smoothness of printed images, taking into account any irregularities that may arise from a printing process. System 100 may compare the smoothness of different prints. System 100 may provide data used to design a print screen to minimize granularity, yielding improved smoothness. System 100 may be based on a graphical user interface (GUI), and can accommodate scanned prints from all various printing technologies including inkjet, laser, electro-photography, lithography, offset, and so on.

The input digital image 102 received by system 100 may be obtained from digital source, e.g., a camera, and/or from a printed image, e.g., based on optical scanning to convert the printed image into a digital image. The input digital image 102 may be a full color image, and may be further converted, e.g., to a luminance-based image (in view of a tendency of the human eye to be particularly sensitive to luminance noise). The input digital image 102 may be converted initially, and/or at other stages in the system 100 (e.g., after producing the second input digital image 104 which also may be converted). Other types of image conversions may be performed, such as color separation and conversion to different colors or color spaces (e.g., National Association of Broadcasters (NAB) color space, luminance (L), color space conversions based on no white balance, no gamma correction, and so on). In an example, the input digital image 102 may be a color image based on the red green blue (RGB) color space converted to luminosity. Conversions may simulate a uniform gray level digital image, and one or more standalone digital separations may be performed. For example, one color separation may be performed based on one slice of a 3D matrix, and several separations may be combined with a model to produce a digital multi separation based on the input digital image 102 for and/or by computing system 100.

The structure module 110 is to receive the input digital image 102, and address periodic (e.g., non-random) noise. For example, the input digital image 102 may contain periodic interference such as a moiré pattern, which is unlike the random effects caused by graininess and mottle. The human eye is particularly sensitive to structure-based noise, which tends to be the first thing noticed when an image sample is viewed by a human observer. The structure module 110 is particularly suited to determine effect(s) that result in image noise based on structure, and is capable of separately identifying such effect(s) without needing to lump such effects together under a single blanket noise rating for the image.

In an example, the structure module 110 may determine structure-based features and/or the structure metric 112 of input digital image 102 based on Fourier or other mathematical transformation performed on the input digital image 102. The structure module 110 may establish a window for a region of the input image 102. For a pixel in the window, the structure module 110 may determine a mathematical mean and mathematical STD of power in this window. If the pixel demonstrates power greater than the mean plus a factor of the STD, then that pixel may be considered to be part of a periodic structure. If the pixel's power does not meet such a threshold, then the pixel may be considered to be a part of a non-periodic graininess and/or mottle. The mean and STD may be calculated in Fourier domain. The structure metric 112 may be expressed as a root sum of squares of the Fourier coefficients that belong to filtered structured input image 102. Other mathematical transforms may be used to determine the structure metric 112, such as a wavelet transform where structure is expressed as a root sum of squares of wavelet coefficients for the structured image. The wavelet transform may apply various modules at each scale of the input digital image 102 (e.g., apply a first wavelet module to the entire image, apply a second wavelet module to half of the image, apply a third wavelet module to quarters of the image, and so on). Such modules may be based on a median. Thus, the structure module 110 may estimate any structured/periodic noise, including 1D features at any orientation, 2D defects, high frequency defects, and so on. The structure module 110 is not limited to detecting 1D horizontal/vertical structured/periodic defects. The structure module 110 may provide results including the structure metric 112 and the second input digital image 104 (e.g., based on removing structure defects from the input digital image 102).

The second input digital image 104 may be produced as a result of a separation, to remove, by the structure module 110, periodic and/or quasi-periodic (e.g., structured) patterns from the input digital image 102. Thus, such structured patterns may be separated out (e.g., as a structured image) before the system 100 is to further determine graininess, mottle, and/or STD. Accordingly, structure-based noise that may be present in the input digital image 102, may be prevented from negatively affecting determinations of graininess and mottle noise, such that the graininess module 120 and the mottle module 130 may provide a more accurate assessment of graininess metric 122 and mottle metric 132. The second input digital image 104 may be provided to the graininess module 120 and the mottle module 130.

The graininess module 120 is to determine small noise components, such as non-periodic high frequency noise (e.g., high spatial frequencies above 1 cycles/mm). In an example, the graininess metric 122 may be determined using Fourier transformation. The graininess module 120 may determine a root sum of squares of Fourier transform coefficients that belong to high spatial frequencies for the filtered non-structured second input digital image 104. The graininess module 120 also may determine the graininess metric 122 based on wavelet transformation, e.g., graininess being determined as a root sum of squares of the wavelet coefficients that belong to high spatial frequencies of the non-structured second input digital image 104. In an example, the graininess module 120 may determine the graininess metric 122 based on ISO techniques, e.g., graininess based on a mean of local variances to calculate ISO graininess on the non-structured second input digital image 104 in the spatial domain.

The mottle module 130 also may receive the second input digital image 104, e.g., operate on an image whose structured noise has been separated out. Mottle, in contrast to graininess, may represent larger noise components including non-periodic low frequency noise (e.g., low spatial frequencies below 1 cycles/mm). The mottle module 130 may determine the mottle metric 132 based on a Fourier transform. For example, mottle may be determined as a root sum of squares of Fourier coefficients that belong to low spatial frequencies found at the filtered non-structured second input digital image 104. The mottle module 130 may determine mottle based on a wavelet transform, where mottle is found as a root sum of squares of wavelet coefficients that belong to low spatial frequencies (e.g., lower than 1 cycles/mm) of the non-structured second input digital image 104. The mottle module 130 also may determine mottle based on ISO techniques, where mottle is found as the STD of local means in the spatial domain of the non-structured second input digital image 104.

The STD module 140 is to determine the STD metric 142, which may be based on, e.g., the structure metric 112, graininess metric 122, mottle metric 132, and/or other features, to indicate overall noise of the input digital image 102. For example, if the input digital image 102 is very grainy, then the STD metric 142 would typically be determined to be high corresponding to the graininess. System 100 goes further than determining the overall STD metric 142, by breaking down the overall noise into three components of structure, graininess, and mottle. Thus, if the STD metric 142 indicates an overall noisy input digital image 102, system 100 further indicates which component metrics of the noise make up the STD metric 142.

More specifically, in an example system 100 based on Fourier transformation, the input digital image 102 may be scanned in RGB color at a resolution of, e.g., 600 dots per inch (dpi) from a sample area of a printed image. The sample area may be chosen based on having a uniform tone. The system 100 may convert the scanned RGB input digital image 102 to luminance, and find its two dimensional Fourier transform. System 100 may locate peaks in the Fourier spectrum as follows. For a pixel in the Fourier domain, calculate the mean and standard deviation (STD) within a local window (such as 10% of the image's size) around the pixel. If pixel Value>[Local Mean+(Factor1×(Local STD))], then the pixel is determined to belong to a peak location. Factor1 may be chosen to have a first, higher value, corresponding to an initial peak detection. The system 100 may check the vicinity of the peak, to include other pixels, e.g., whose pixel Value>[Local Mean+(Factor2×(Local STD))]. Factor2 may be chosen to have a second, lower value, corresponding to growing the region of the peak. Next, the system 100 may filter the input digital image 102 based on a human visual system (HVS) model. Filtering based on an HVS model may filter out various forms of noise, such as imperceptible spatial frequencies. The structure metric 112 may be determined after applying the HVS model, such that the system 100 may apply the HVS model prior to and/or at the structure module 110. Application of the HVS model is optional. The structure module 110 may determine the structure metric 112 by summing the peaks in the Fourier domain, e.g., after application of the HVS model. The structure module 110 also may remove the peaks (e.g., corresponding to structure noise), and produce the second input digital image 104. The graininess module 102 may determine the graininess metric 122 based on the sum of Fourier coefficients of the second input digital image 104 that belong to high spatial frequencies (e.g. >1 cycles/mm) at the non-peaks locations of the second input digital image 104. The mottle module 130 may determine the mottle metric 132 based on the sum of Fourier coefficients of the second input digital image 104 that belong to low spatial frequencies (e.g. <1 cycles/mm) at non-peak locations of the second input digital image 104. The STD module 140 may determine the STD metric 142 of the filtered image as an indication of the total smoothness. The STD module 140 may determine the STD metric 142 as being proportional to the root sum of squares of the structure metric 112, the graininess metric 122, and the mottle metric 132, according to Parseval's theorem.

Examples of system 100 may rely on local thresholding and/or double thresholding (e.g., region growing). Local thresholding is useful for detecting small compact peaks, including quasi-periodic structures or other low contrast structures/features/defects. Double thresholding may be used for locating a full area of a peak. Thus, local thresholding may detect low contrast peaks, and double thresholding (region growing) may detect the full area of the peak. As described in the examples above, double local thresholding may be used in the Fourier domain (where the peaks correspond to structured noise) to check a vicinity of a peak, and include pixels having values higher than some lower threshold. Double thresholding may increase the likelihood of detecting the entire fullness of a peak, in contrast to detecting only a portion of a peak (e.g., when using only a single threshold). In alternate examples, local thresholding and/or double thresholding may be used selectively, without needing to use both.

Local thresholding and/or double thresholding may be performed by system 100 based on a two-pass approach. In the first pass, system 100 may detect a pixel in the Fourier domain that passes a first local threshold, i.e., detect a seed pixel for the peak set. In the second pass, system 100 may examine a neighborhood of the pixel from the first pass (e.g., within a window surrounding the seed pixel), and add to the peak set those pixels that are higher than a second, lower threshold. Thus, system 100 may avoid locating merely a portion of a peak while missing the rest of the peak, because tiered thresholds may be used to detect the highest peaks, as well as the corresponding surroundings of the peaks. The higher first threshold may be, e.g., (mean+(factor1*local STD)), whereas the lower second threshold may be about a third of the prior threshold, e.g., (mean+(factor2*local STD)). The thresholds may be varied based on other values, depending on the desired levels of detection regarding peaks.

Accordingly, system 100 may determine overall smoothness of an image based on STD metric 142, as well as individual components that affect smoothness based on the structure metric 112, graininess metric 122, and/or mottle metric 132. System 100 may make such determinations that correlate well with human-metrology based impressions of graininess in several types of prints from different print technologies. For example, various metric parameters/factors (e.g., first and second thresholds) may be tuned to enable the computing system 100 to correlate with typical human perceptions of image smoothness. The system 100 may output four numbers corresponding to the four metrics of the input digital image 102. Because STD represents a combination of the image noise, the three metrics of structure 112, graininess 122, and mottle 132 provide a relative comparison of what portion of those noise types make up the overall noise. For example, if the structure metric 112 is zero, but the graininess metric 122 is 2.5 (and the STD metric is 2.8), then the overall noise is primarily composed of graininess noise. Thus, system 100 not only measures smoothness, but also identifies various separate smoothness components and enables smoothness to be improved by identifying which image noise component(s) to address. System 100 works with both digital and scanned images, and may take into account the HVS factor calibrated specifically to how human vision perceives image smoothness and/or noise.

More specifically, the various metrics shown in FIG. 1 may indicate that a larger proportion of total noise is a result of a particular metric (e.g., graininess metric 122, in contrast to mottle/structure). This determination, based on the individual component smoothness metrics, may be performed by example systems before needing to print any output images (e.g., needing to undergo time and resource intensive iterations of printing/evaluating/adjusting). The metrics and determinations may be used by example systems to provide guidance as to what types of approaches may be used to minimize the overall noise (typically corresponding to the STD metric). For example, to reduce overall noise, a different halftone dithering technique may be used that reduces graininess specifically, which can particularly target graininess among the component metrics. Halftoning approaches may include those based on clustering, Poisson distributions, and other techniques. A halftone approach may minimize the graininess of image dithering, by creating uniformity in the patch. The input image may be re-printed using the new dithering approach, and example systems can verify that the overall noise (STD metric) decreases, corresponding to the improvement in the component metric corresponding to the new form of dithering. Thus, when looking at the components of the noise, the mottle and structure metrics may remain roughly the same (especially structure), but the graininess may decrease as expected due to application of an algorithm that was chosen to specifically decrease the graininess. Similar approaches may be used to address other metrics. For example, if the metrics reveal a high structure score, this may indicate a periodic artifact arising from some kind of interaction between dithering techniques and printer hardware. Thus, in addition to changing the dithering technique, solutions to improve overall smoothness also may involve changing the machine used to print the output (e.g., to address the structure metric). Accordingly, by breaking down the noise into three component metrics, a better understanding of the noise is realized, which enables the production of smoother screens, prints, half tones, and/or images. Further, example systems to obtain the component metrics may be based on fully automated techniques, applicable to digital images before needing to print the images, enabling selection of new dithering techniques before needing to print an input image.

Figure 2:
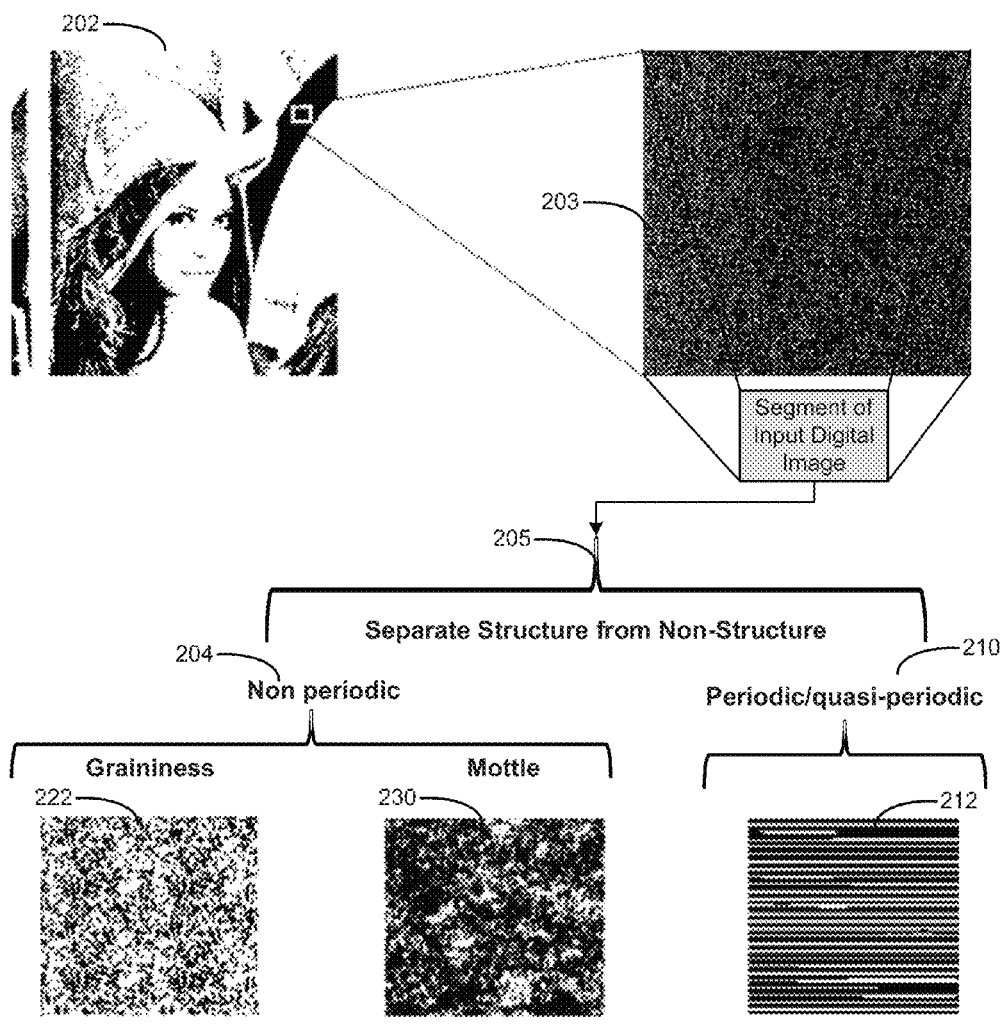
FIG. 2 is a block diagram of a separation of an input digital image according to an example.

FIG. 2 is a block diagram of a separation 205 of an input digital image 202 according to an example. A segment 203 of the input digital image 202 is obtained. The segment 203 is separated 205 into structure and non-structure components. The non-structure components correspond to non-periodic components 204 (e.g., from a second input digital image), including graininess components 222 and mottle components 230. The structure components correspond to periodic/quasi-periodic components 210, including structure components 212.

Any type of digital image 202 may be used, including those originating from a printout that are subsequently scanned into digital form. A system may perform segmentation on the input digital image 202, e.g., to identify candidate regions to obtain a segment 203 having a more constant/uniform gray level/color. The input digital image 202 may be a full color image having variations in tone and other features, and the system may identify a segment 203 of the input digital image having a relatively constant color and/or gray level within the full color image. In an example, the system may convert either the input image 202 and/or the segment 203 into grayscale, luminance, or other color spaces. In an alternate example, the input digital image 202 may be based on a scan of a print job from a printer, where the print job includes numerous (e.g., 30) patches of constant gray level, where the patches vary from light to dark across the print job. The system may identify and scan each patch to provide a plurality of varying segments 203 for analysis across a range of printing conditions provided by the printer. Thus, examples may include not only one segment/separation as illustrated, but numerous variations including common combinations of colors (cyan-magenta-yellow-black (CMYK) single separations, and combinations CM, CK etc.). Example systems may identify appropriate segments of the input image 202 automatically, without a need to manually crop each segment 203.

At separation 205, the system is to find periodic/quasi-periodic features 210 including structured noise 212. The system may find structured noise 212 based on Fourier peaks using local and/or double thresholding (e.g., in contrast to using global thresholding). After finding structure 212, the system may separate the image segment 203 into a structured image and a non-structured (non-periodic) image, whose structured elements have been removed. In an example, the structured elements may be removed from the input image, using Fourier transform, by setting the amplitudes (coefficients) at the peaks locations to zero, and then using an inverse Fourier transform. The remaining non-periodic portion 204 contains low frequency features (e.g., mottle 230) and high frequency features (e.g., graininess 222). The system may find mottle 230 and graininess 222 based on application of the Fourier domain, e.g., on the non-periodic portion 204 after performing the separation 205 to take out the structure 210. To determine mottle 230, the system may filter the non-periodic portion 204 using a low-pass filter, to obtain the low frequencies for the mottle 230. To determine graininess 222, the system may filter the non-periodic portion 204 using a high-pass filter, to obtain the high frequencies for the graininess 230.

Human visual systems typically are more sensitive to noise based on luminance, and less sensitive to noise based on color. Thus, if the input image 202 and/or segment 203 contain color, they may be transformed to obtain a luminance portion. The luminance transformation may be based on a linear combination of the RGB color space representation to convert RGB to grayscale. A constant gray level in segment 203 enables more consistent reproducibility and predictability of results, although examples may address variations such as dust or other spots within the segment 203.

Figure 3A:
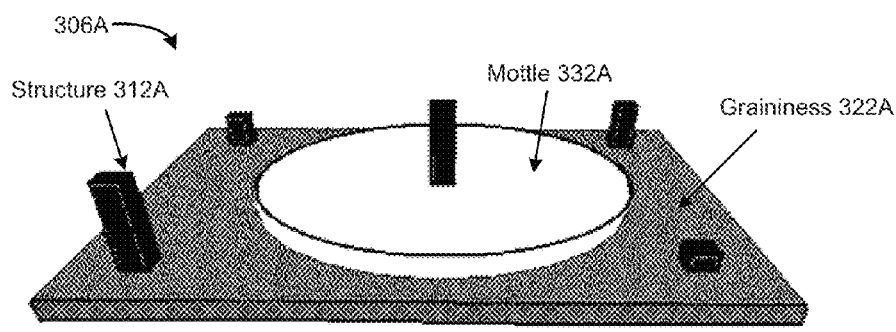
FIG. 3A is a diagram of a Fourier transform of an input digital image according to an example.

FIG. 3A is a diagram of a Fourier transform 306A of an input digital image according to an example. The Fourier transform 306A includes representations of structure 312A, graininess 322A, and mottle 332A.

In the Fourier domain representation of FIG. 3A, an image is transformed according to a Fourier domain transformation. The Fourier transformation reveals the structure portions as vertical columns, the graininess portions as the background representing non-periodic/non-fixed locations having high frequencies, and the mottle portions as a raised cylinder representing non-periodic/non-fixed locations having low frequencies. Thus, FIG. 3A illustrates that Fourier domain analysis may be used for simultaneously estimating/representing the graininess 322A, mottle 332A, and structure 312A noise/defects. The structure 312A elements stand out as prominently identifiable peaks in the Fourier domain.

In Fourier domain analysis, the Fourier transform of a constant gray level image produces Fourier coefficients/components. The STD metric may be obtained by summing the root sum of squares of all the Fourier coefficients/components in the Fourier domain. Individual components (structure 312A, mottle 332A, graininess 322A) may be obtained based on designing the Fourier domain to correspond to those three components, e.g., by summing the part of the Fourier domain corresponding to the desired component/metric. For example, The Fourier transform 306A may include peaks corresponding to individual structure elements as illustrated, and summing all the peaks results in the metric for the structure 312A. Summing the high frequencies corresponding to non-peak locations provides the graininess metric 322A. Summing the components at lower frequencies at non-peak locations provides the mottle metric 332A. Summing the squares of all the metrics provides the square of the STD metric.

Figure 3B:
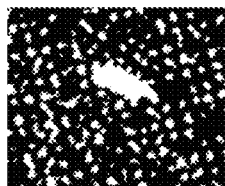
FIG. 3B is a diagram of an input digital image including a dust region and a non-dust region according to an example.
Figure 3B:
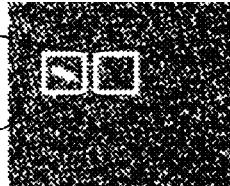
Figure 3B:
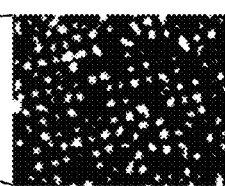

FIG. 3B is a diagram of an input digital image 302B including a dust region 303B and a non-dust region 304B according to an example. Analysis of two segments 303B and 304B of the input digital image 302B are shown, based on Fourier transformations and wavelet transformations. The dust region 303B segment results in Fourier metrics of STD=5.1484, graininess=3.60, mottle=3.67, and structure=0.003; and wavelet metrics of STD=1.3, graininess=1.13, mottle=0.7, and structure=0.004. The non-dust region 304B segment results in Fourier metrics of STD=1.15, graininess=0.8, mottle=0.7, and structure=0.01; and wavelet metrics of STD=1.1, graininess=0.9, mottle=0.6, and structure=0.01.

For the non-dust region 304B, the Fourier and wavelet approaches generally provide similar results, in contrast to the dust region 303B showing varying results between the Fourier and wavelet approaches. The dust region 303B includes defect noise caused by the dust spot, which affects the Fourier approach (in particular, the graininess and mottle metrics) to a greater extent than the wavelet approach. In an example approach, the graininess and mottle metrics are determined after subtracting periodic noise (i.e., structure) from the input image. The resulting image contains non-periodic noise from graininess and mottle, which may be isolated using low-pass and high-pass filters. However, under Fourier domain analysis, the graininess and mottle metrics are sensitive to defect noise such as the dust region shown in FIG. 3B. More specifically, the graininess and mottle metrics result in relatively high values under Fourier analysis, due to the defect noise from the dust region being large compared to the total isolated patch segment size.

To overcome this challenge of defect noise, the various metrics may be determined using a different approach. Instead of and/or in addition to using Fourier transformations, examples provided herein may use wavelet transformations to obtain the STD, graininess, mottle, and structure metrics. Examples herein may apply wavelet transforms e.g., for various frequencies, which in terms of wavelet transformation may be referred to as scales. Wavelet transformations may be applied at various scales to obtain varying results, which may be considered together (e.g., by taking a median of the results across the scales).

The wavelet transform approach may be combined with a Fourier domain approach. The Fourier domain may be used to perform a separation on the input image, to separate the structure features from the non-structure features, by producing a non-periodic image that contains the mottle and graininess components, and a periodic/quasi-periodic image that contains the structure components of the input image. Example systems may perform the separation using Fourier transforms by finding peak locations, setting other non-peak coefficients to zero, performing an inverse Fourier transform, and obtaining an image that contains the structure information. Another image containing non-structure information may be obtained by setting the peak locations to zero, and then using an inverse Fourier transform. After applying these Fourier transforms to obtain the separation into two images, the wavelet transforms may be applied to the two separated images. Applying wavelet transforms to the non-periodic graininess and mottle image provides a wavelet approach to separate the non-periodic image into low and high frequency components for mottle and graininess metrics respectively. For example, a system may sum the high (low) frequency wavelet coefficients, and/or determine a median to get the graininess (mottle) metric in the image domain. Example systems may sum all wavelet coefficients of the structured image and/or determine a median to obtain the structure metric.

Considering the metrics (excluding the overall STD metric) obtained for the dust and non-dust regions 303B, 304B of the input image, there is general agreement that the graininess metric exceeds the mottle and structure metrics (except for the Fourier analysis on the dust region 303B). The wavelet approach to the dust region 303B is shown to provide results that generally agree with the non-dust region 304B results, indicating that the wavelet approach can provide good results even in the presence of local defect occupying a substantial portion of the segment to be analyzed.

Figure 4:
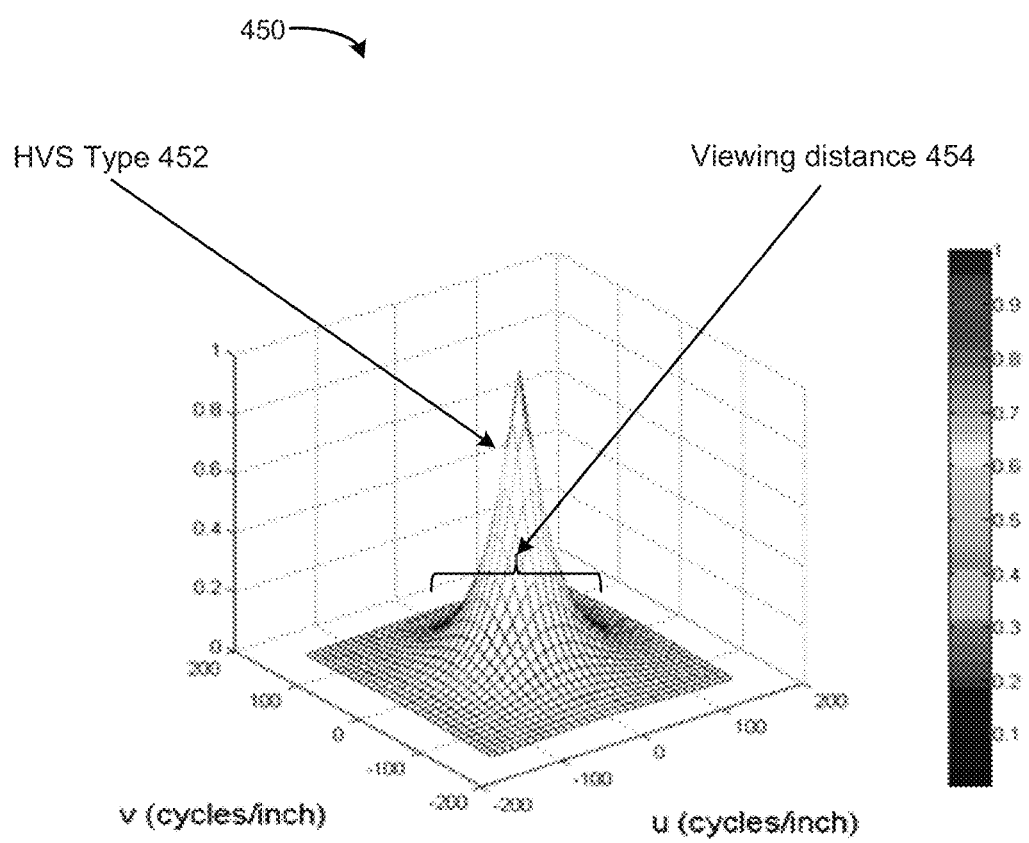
FIG. 4 is a block diagram of a human visual system (HVS) model including HVS type and viewing distance according to an example.

FIG. 4 is a block diagram of a human visual system (HVS) model 450 including HVS type 452 and viewing distance 454 according to an example. Various HVS types 452 are available, including here also contrast sensitivity functions (CSFs) and each may be configured according to a selectable viewing distance 454.

An HVS model 450 may be used to simulate how the human eye (visual system) can detect various smoothness characteristics, including graininess, mottle, and/or structure, of an image. Several HVS models (HVS functions) and viewing distances may be used. For example, a Mannos HVS type 452 and viewing distance of 60 cm may be used to simulate the perceptions of a human observer.

A human observer that looks at an image may perceive the image differently than an optical scanner. For example, a human may not perceive some of the optical frequencies that a scanner is capable of detecting. The HVS model 450 can take an image and simulate how the human visual system (HVS) would perceive that image, by modifying an input image to produce an output image. Example systems provided herein may filter an input image using an HVS model 450, in addition to other analysis/modification to determine various metrics. Example systems operating on an input image may apply an HVS filter after locating peaks in the Fourier domain. Thus, the HVS model 450 may be applied to the results of Fourier transformations, and do not need to be applied to the input digital image. Accordingly, it is possible to use the HVS model 450 in a way that is compatible with improving detection of the peaks, especially at high spatial frequencies where the HVS values may be low. The HVS model 450 may be used to remove structured and non-structured nonuniformities from an input digital image. The HVS model 450 may be used for removing data to which the human eye is not sensitive. For example, the HVS model 450 may act as a low-pass filter and/or threshold function in the Fourier domain.

A human observer may perceive noise and halftoning differently than an optical scanner, especially in view of the different affects that various types of noise and halftoning approaches may have on the human visual system (e.g., a human may perceive structural noise having more of a subjective impact than graininess). Thus, the HVS model 450 may be used to identify halftoning approaches that benefit a human observer, because human vision may not place a high subjective smoothness importance on image elements such as the details of tiny dots that compose an overall halftoned image. Thus, examples may produce improved printing screens, i.e., halftoning and/or dithering approaches, based on predicting the smoothness metrics that are produced by application of an HVS model 450.

Various approaches (HVS types 452) may be used to model the HVS. In the Fourier domain, the HVS model 450 appears to be similar to a low-pass filter. Examples of HVS type 452 include Mannos, Nassanan, Daly, and so on. The HVS type 452 can determine a shape of the low pass filter. In working with an HVS model 450, the viewing distance 454 determines a width of the low pass filter. Changing the viewing distance 454, or the HVS type 452, can change results produced by the HVS model 450. Such changes can model the behavior of the human visual system, in that a human viewing an image from a near distance can perceive image noise differently than the noise perceived when viewing the image from far away. At a far viewing distance, human vision tends to perceive coarse noise elements, and at a near viewing distance, human vision tends to perceive small noise elements. Example systems may use many types of HVS models 450 that would correspond with a human visual assessment of a given image. Thus, example systems are not limited to the types of models specifically mentioned.

In an example, human metrology experiments were conducted to identify HVS model types and tune the HVS viewing distance parameters for the model types. Various combinations of model types and viewing distance parameters were used to achieve desired correlations to visual assessments of graininess. Various color patches were given to human observers to rate the patches from most to least smooth. Those same patches were scanned and analyzed by example systems based on determining smoothness metrics as described herein. The example systems used several HVS models and viewing distances, and determined which parameters resulted in a high correlation with the human observers. The model's parameters may depend on specific application (e.g., may include some scaling effects), and is not necessarily the same viewing distance that a human used to view the patches. A typical viewing distance for a human is approximately 30-40 cm. Furthermore, in a different HVS model (Nassanan), a first viewing distance may produce similar results as another model (Mannos) using a second viewing distance, for example. Thus, variation exists between different models and the effect of viewing distances.

Figure 5:
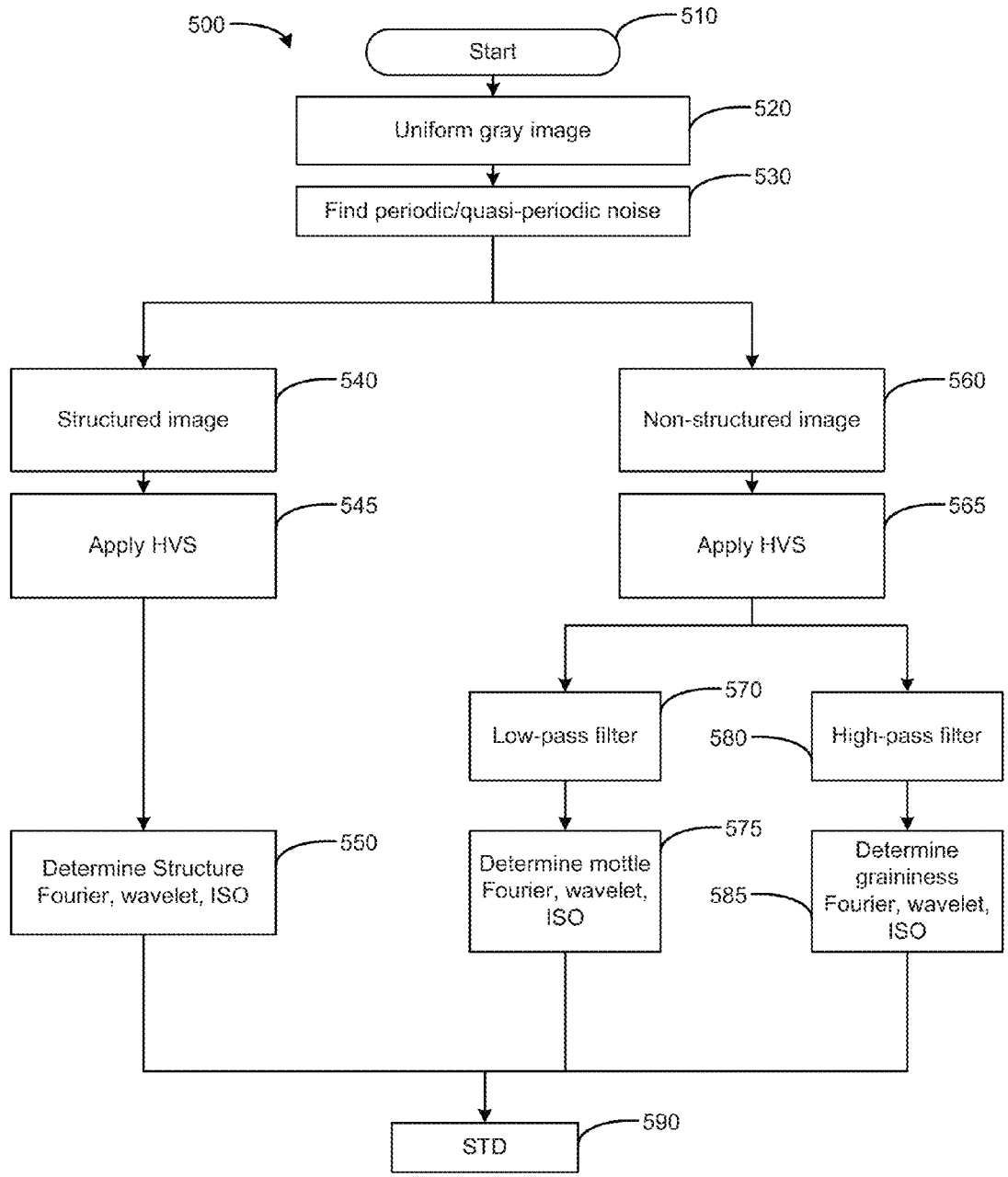
FIG. 5 is a flow chart based on determining structure, mottle, and graininess of an input image according to an example.
Figure 6:
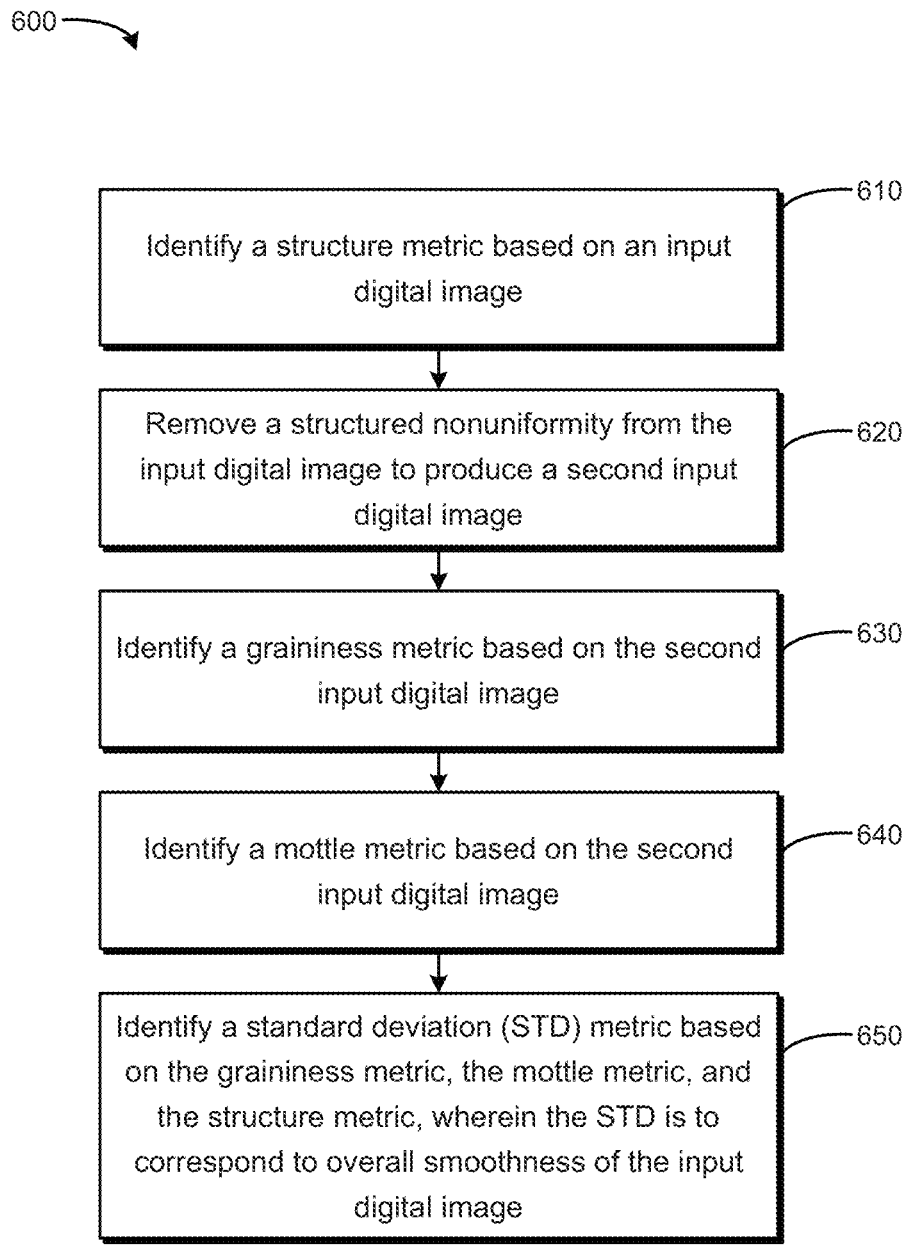
FIG. 6 is a flow chart based on identifying structure, graininess, mottle, and STD of an input image according to an example.

Referring to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 5 is a flow chart 500 based on determining structure, mottle, and graininess of an input image according to an example. Flow begins at block 510. In block 520, a uniform gray image is received. In an example, a patch may be scanned with uniform tone at a resolution of 600 dots per inch or higher, or a digital image of a screen (before it was printed) may be used. A scanned or digital image (e.g., in color such as RGB color space) may be converted to luminance or other color spaces. In block 530, periodic and/or quasi-periodic noise is found. In an example, the noise may be used to identify structured and non-structured portions of the image. For example, a two-dimensional Fourier transform of the input one-tone image may be determined. Peaks in the Fourier spectrum may be located as follows: for each pixel in Fourier domain, calculate the mean and standard deviation (STD) within a local window (such as 10% of the image's size) around that pixel. If the pixel's value exceeds a first threshold, then the pixel belongs to a peak location. The vicinity of the peak may be checked, to include additional pixels whose pixel value exceeds a second, lower threshold. In block 540, a structured image is obtained. For example, the results of locating the peaks may be used to perform a separation of the input image into structured image and a non-structured (e.g., second) image. In block 545, a human visual system (HVS) is applied. For example, the input image may be filtered (in Fourier domain) using an HVS model to disregard imperceptible spatial frequencies. The HVS model may be applied after locating the peaks in Fourier domain, before proceeding to determine a component smoothness metric based on summing the corresponding transform (Fourier, wavelet, etc.) components. In block 550, structure is determined, based on at least one of Fourier, wavelet, and ISO. For the Fourier approach, structure is found as the sum of the peaks in the Fourier domain, after applying the HVS. For the wavelet method, structure is found as the sum (or median multiplied by the number of elements) of the root sum of squares of the wavelet coefficients of the structured image obtained after setting the amplitude of the non-peak locations to zero at the separation and performing an inverse Fourier transform. For the ISO approach, structure is found as the sum of ISO 13660 graininess and mottle metrics applied on the structured image.

In block 560, a non-structured image is obtained as a result of the separation of the input image into structured and non-structured images. In block 565, HVS is applied, to filter the input image (in the Fourier domain) with the HVS model to ignore imperceptible spatial frequencies. Following block 565, the results are used to determine mottle and graininess. In the case of determining mottle, in block 570, a low-pass filter is applied. In block 575, mottle is determined, based on at least one of Fourier, wavelet, and ISO. For the Fourier approach, mottle is found as a sum of Fourier coefficients that belong to low spatial frequencies (e.g. <1 cycles/mm) at non-peak locations of the non-structured image. For the wavelet approach, mottle is found as the sum of wavelet coefficients that belong to low spatial frequencies (e.g. <1 cycles/mm) of the non-structured image. For the ISO approach, mottle is found by applying an ISO 13660 mottle metric to the non-structured image.

Returning to block 565, in the case of determining graininess, in block 580, a high-pass filter is applied, e.g., filtering the input image (in Fourier domain). In block 585, graininess is determined, based on at least one of Fourier, wavelet, and ISO. For the Fourier approach, graininess is found as a sum of Fourier coefficients that belong to high spatial frequencies (e.g. >1 cycles/mm) at the non-peak locations of the non-structured image. For the wavelet approach, graininess is found as a sum (or median multiplied by the number of elements) of wavelet coefficients at high spatial frequencies (e.g. >1 cycles/mm) of the non-structured image obtained after setting the amplitude of the peak locations to zero at the non-structured image and performing an inverse Fourier transform. For the ISO approach, graininess is found by applying the ISO 13660 graininess metric to the non-structured image.

Flow proceeds to block 590, where a fourth metric also may be obtained: STD (total smoothness). STD may be found based on taking the root sum of squares of the above three metrics (structure, mottle, graininess), according to Parseval's theorem. The three metrics may be found based on Fourier, wavelet, ISO, or a combination.

FIG. 6 is a flow chart 600 based on identifying structure, graininess, mottle, and standard deviation (STD) of an input image according to an example. In block 610, a structure metric is identified based on an input digital image. For example, based on a Fourier transform and peak detection using double local thresholding. In block 620, a structured nonuniformity is removed from the input digital image to produce a second input digital image. For example, the input image may be separated into structured and non-structured images, such that the second input digital image corresponds to the non-structured image. In block 630, a graininess metric is identified based on the second input digital image. For example, a high-pass filter may be used to identify graininess, and corresponding coefficients of a transformation may be summed. In block 640, a mottle metric is identified based on the second input digital image. For example, a low-pass filter may be used to identify mottle, and corresponding coefficients of a transformation may be summed. In block 650, a standard deviation (STD) metric is identified based on the graininess metric, the mottle metric, and the structure metric, wherein the STD is to correspond to overall smoothness of the input digital image. For example, a square of the STD may be proportional to a sum of squares of the component metrics (graininess, mottle, and structure).

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A computing system comprising:
at least one processor,
wherein the at least one processor is to:
identify a structure metric based on an input digital image, and remove a structured nonuniformity from the input digital image to produce a second input digital image;
identify a graininess metric based on the second input digital image;
identify a mottle metric based on the second input digital image; and
determine a standard deviation (STD) metric from the structure metric, the graininess metric and the mottle metric, wherein the STD metric corresponds to overall smoothness of the input digital image and is proportional to a root sum of squares of the graininess metric, the mottle metric, and the structure metric.

2. The computing system of claim 1, wherein the at least one processor is to identify at least one of the structure metric, the graininess metric, and the mottle metric based on a two-dimensional transform applied to at least one of the input digital image and the second input digital image.

3. The computing system of claim 1, wherein the at least one processor is to remove the structured nonuniformity from the input digital image based on setting a local threshold for each pixel of the input digital image, wherein the local threshold is based on local image properties.

4. The computing system of claim 1, wherein the at least one processor is to remove the structured nonuniformity from the input digital image based on applying double local thresholding in Fourier domain, based on a first pass to identify a local peak based on a first local threshold, and a second pass in the vicinity of the local peak based on a second local threshold lower than the first local threshold, to identify an extent of area of the local peak.

5. A non-transitory machine-readable storage medium encoded with instructions executable by a computing system that, when executed, cause the computing system to:
identify a structure metric based on an input digital image;
remove a structured nonuniformity from the input digital image to produce a second input digital image;
identify a graininess metric based on the second input digital image;
identify a mottle metric based on the second input digital image; and
identify a standard deviation (STD) metric based on the graininess metric, the mottle metric, and the structure metric, wherein the STD is to correspond to overall smoothness of the input digital image and is proportional to a root sum of squares of the graininess metric, the mottle metric, and the structure metric.

6. The storage medium of claim 5, further comprising instructions that cause the computing system to manipulate the input digital image to reduce a value of at least one isolated metric among the structure metric, the graininess metric, and the mottle metric; and modify image processing to be performed on the input digital image corresponding to achieving the reduced value in the at least one isolated metric to improve the smoothness of the input digital image.

7. The storage medium of claim 5, further comprising instructions that cause the computing system to prepare a halftoning screen to improve the smoothness of printing the input digital image by counteracting at least one isolated metric among the structure metric, the graininess metric, and the mottle metric.

8. The storage medium of claim 5, further comprising instructions that cause the computing system to generate a Fourier domain transform of the input digital image, locate peaks in the input digital image Fourier domain transform to remove the structured nonuniformity from the input digital image, and apply a human visual system (HVS) model to the input digital image in the Fourier domain, to remove non-perceptual data from the input digital image.

9. The storage medium of claim 5, further comprising instructions that cause the computing system to generate a Fourier transform of the input digital image, identify at least one Fourier domain component corresponding to a peak of the Fourier transform, and sum the at least one Fourier domain component to identify the structure metric.

10. The storage medium of claim 9, further comprising instructions that cause the computing system to identify the at least one peak of the Fourier domain components of the Fourier transform based on double local thresholding, including identifying a local window of the Fourier domain components, determining a local mean and local STD for the local window, and identifying the at least one peak based on exceeding a first local threshold and second local threshold for the local window, wherein the first local threshold is a function of the local mean and the local STD, and the second local threshold is lower than the first local threshold.

11. The storage medium of claim 10, wherein the first local threshold is equal to the local mean plus a first multiple of the local STD, and the second local threshold is equal to a second multiple of the local STD.

12. The storage medium of claim 5, further comprising instructions that cause the computing system to generate a transform of the second input digital image, identify at least one high frequency component corresponding to a non-peak of the transform, and sum the at least one high frequency component to identify the graininess metric, wherein the high frequency corresponds to aperiodic fluctuations of density at a spatial frequency greater than or equal to substantially one cycle per millimeter.

13. The storage medium of claim 5, further comprising instructions that cause the computing system to generate a transform of the second input digital image, identify at least one low frequency component corresponding to a non-peak of the transform, and sum the at least one low frequency component to identify the mottle metric, wherein the low frequency corresponds to aperiodic fluctuations of density at a spatial frequency less than or equal to substantially one cycle per millimeter.

14. A non-transitory machine-readable storage medium encoded with instructions executable by a computing system that, when executed, cause the computing system to:
segment the input image to identify at least one candidate section associated with a substantially constant brightness gray level across a usable local window, wherein the candidate section is used for analyzing the input image;
identify a structure metric based on the input digital image;
remove a structured nonuniformity from the input digital image to produce a second input digital image;
identify a graininess metric based on the second input digital image;
identify a mottle metric based on the second input digital image; and determine a standard deviation (STD) metric from the structure metric, the graininess metric and the mottle metric, wherein the STD metric corresponds to overall smoothness of the input digital image and is proportional to a root sum of squares of the graininess metric, the mottle metric, and the structure metric.

15. The storage medium of claim 14, wherein the instructions cause the computing system to:
segment the input image to identify candidate sections, wherein each candidate section is associated with a substantially constant brightness gray level across a usable local window; and
for each candidate section:
identify the structure metric, the graininess metric and the mottle metric; and
determine the STD metric from the structure metric, the graininess metric and the mottle metric.

16. The storage medium of claim 14, further comprising instructions that cause the computing system to generate a Fourier transform of each candidate section, identify at least one Fourier domain component corresponding to a peak of the Fourier transform, and sum the at least one Fourier domain component in each candidate section to identify the structure metric.

17. The storage medium of claim 16, further comprising instructions that cause the computing system to: identify the at least one peak of the Fourier domain components of the Fourier transform based on double local thresholding, identify a local window of the Fourier domain components, determine a local mean and local STD, and identify the at least one peak based on exceeding a first local threshold and second local threshold, wherein the first local threshold is a function of the local mean and the local STD, and the second local threshold is lower than the first local threshold.

18. The storage medium of claim 17, wherein the first local threshold is equal to the local mean plus a first multiple of the local STD, and the second local threshold is equal to a second multiple of the local STD.

\* \* \* \* \*